(12) United States Patent
Suzuki et al.

(10) Patent No.: US 7,451,854 B2
(45) Date of Patent: Nov. 18, 2008

(54) EXHAUST FLOW RATE CONTROL VALVE

(75) Inventors: Hikaru Suzuki, Wako (JP); Masaki Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 453 days.

(21) Appl. No.: 11/414,618

(22) Filed: Apr. 28, 2006

(65) Prior Publication Data
US 2006/0260868 A1 Nov. 23, 2006

(30) Foreign Application Priority Data
May 18, 2005 (JP) .............................. 2005-145180

(51) Int. Cl.
*F01N 1/10* (2006.01)
*F16K 17/04* (2006.01)
*F16K 17/30* (2006.01)
*F01N 1/16* (2006.01)
*F01N 1/08* (2006.01)
*F16K 1/16* (2006.01)

(52) U.S. Cl. ..................... 181/237; 181/241; 251/303; 60/324

(58) Field of Classification Search ................ 181/237, 181/236, 241, 254, 277, 278; 251/303, 337; 137/535; 60/322, 324
See application file for complete search history.

(56) References Cited

U.S. PATENT DOCUMENTS

| | | | | |
|---|---|---|---|---|
| 1,553,264 A | * | 9/1925 | Reasonover | 181/254 |
| 2,072,372 A | * | 3/1937 | Riethmiller | 181/264 |
| 2,157,030 A | * | 5/1939 | Starkweather et al. | 181/254 |
| 2,404,589 A | * | 7/1946 | Monaghan | 181/232 |
| 2,492,784 A | * | 12/1949 | Christman | 181/236 |
| 3,234,924 A | * | 2/1966 | May | 123/323 |
| 3,703,937 A | * | 11/1972 | Tenney | 181/226 |
| 3,774,879 A | * | 11/1973 | Zink | 251/303 |
| 4,609,068 A | * | 9/1986 | Backlund | 181/226 |
| 4,699,244 A | * | 10/1987 | Bergquist et al. | 181/226 |
| 4,903,486 A | * | 2/1990 | Finkle | 60/324 |
| 5,355,673 A | | 10/1994 | Sterling et al. | |
| 5,603,214 A | * | 2/1997 | Abels et al. | 60/273 |
| 6,425,412 B2 | * | 7/2002 | Sterling | 137/527 |
| 6,527,006 B2 | * | 3/2003 | Jackson | 137/527.6 |
| 6,564,902 B1 | * | 5/2003 | Saberi | 181/237 |
| 2006/0059902 A1 | * | 3/2006 | Gerards et al. | 60/324 |
| 2008/0104950 A1 | * | 5/2008 | Palanchon et al. | 60/324 |

* cited by examiner

*Primary Examiner*—Edgardo San Martin
(74) *Attorney, Agent, or Firm*—Carrier, Blackman & Associates, P.C.; Joseph P. Carrier; William D. Blackman

(57) ABSTRACT

An exhaust flow rate control valve includes an on-off valve which is switched between a closed state in which a flow passage area of an exhaust pipe is decreased, and an opened state in which the flow passage area is increased. A notch is formed in the on-off valve, and a recess is formed in an inner pipe member of the exhaust pipe to correspond to the notch. A resilient member, for biasing the on-off valve in a closing direction, is disposed in a space formed between the recess and an outer pipe member of the exhaust pipe. Thus, the degree of freedom is improved in setting the operating characteristic of the on-off valve, without increasing the size of an exhaust structure.

10 Claims, 6 Drawing Sheets

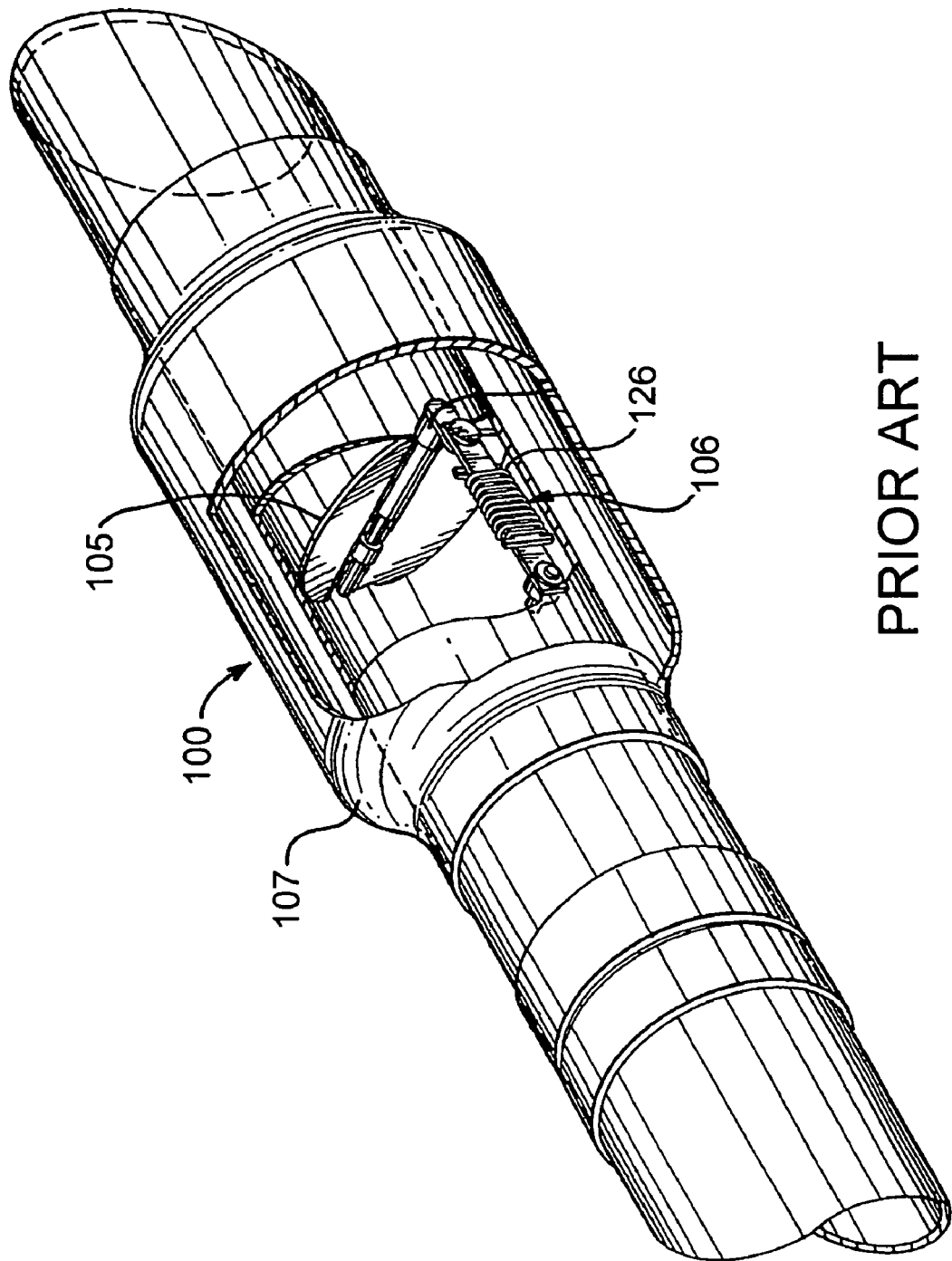

EXHAUST FLOW RATE CONTROL VALVE

CROSS-REFERENCE TO RELATED APPLICATIONS

The present invention claims priority under 35 USC 119 based on Japanese patent application No. 2005-145180, filed on May 18, 2005. The subject matter of this priority document is incorporated by reference herein.

BACKGROUND OF THE INVENTION

1. Field of the Invention

The present invention relates to an exhaust flow rate control valve provided in an exhaust pipe through which exhaust gas of an engine is passed.

2. Description of the Background Art

There is a conventionally known exhaust flow rate control valve 100 (FIG. 6) including: an on-off valve 105 which is provided in an exhaust pipe through which exhaust gas of an engine is passed and which is switched between a closed state in which a flow passage sectional area in the exhaust pipe is decreased and an opened state in which the flow passage sectional area is increased; and a resilient member 126 for biasing the on-off valve 105 in a closing direction, the on-off valve 105 being switched from the closed state to the opened state by an increase in pressure of the exhaust gas acting on the on-off valve 105 against a biasing force of the resilient member 126 (see U.S. Pat. No. 5,355,673).

In the exhaust flow rate control valve disclosed in U.S. Pat. No. 5,355,673, the resilient member 126 and a link mechanism 106, which is interposed between the resilient member 126 and the on-off valve 105, are disposed between the exhaust pipe and an outer pipe 107 which surrounds the exhaust pipe, thereby preventing the resilient member 126 and the link mechanism 106 from being thermally deteriorated due to their direct exposure to the exhaust gas or damaged due to flying stones and the like. Further, the resilient member 126 and the link mechanism 106 are formed to be thin in a radial direction of the pipe, and compactly accommodated between the exhaust pipe and the outer pipe 107.

However, depending on the setting of the operating characteristic of the on-off valve 105, the resilient member 126 and the link mechanism 106 cannot be always formed to be thin. In this case, it is necessary to increase the diameter of the outer pipe 107 to radially enlarge the space formed between the exhaust pipe and the outer pipe 107 so that the resilient member 126 and the link mechanism 106 can be accommodated therein. However, this arrangement is problematic since the exhaust structure is increased in size at a place where the exhaust flow rate control valve is provided.

SUMMARY

Accordingly, it is an object of the present invention to provide an improved exhaust flow rate control valve which solves the above-described problem.

In order to achieve the above object, according to a first feature of the present invention, there is provided an exhaust flow rate control valve comprising an exhaust pipe which is provided in an exhaust system for an engine, and which includes an inner pipe member through which exhaust gas is passed and an outer pipe member surrounding the inner pipe member. The exhaust flow rate control valve also comprises an on-off valve provided in the inner pipe member, the on-off valve switchable between a closed state in which a flow passage sectional area of the inner pipe member is decreased, and an opened state in which the flow passage sectional area is increased. In addition, the exhaust flow rate control valve comprises a resilient member disposed between the inner pipe member and the outer pipe member so as to bias the on-off valve in a closing direction, the on-off valve being switched from the closed state to the opened state by an increase in pressure of the exhaust gas acting on the on-off valve against a biasing force of the resilient member. In the inventive exhaust flow rate control valve, a notch is formed in the on-off valve, a recess is formed in the inner pipe member to correspond to the notch, and the resilient member is disposed in a space formed between the recess and the outer pipe member.

With the first feature of the present invention, the space for disposition of the resilient member for biasing the on-off valve in the closing direction can be radially enlarged, whereby the valve is not influenced by the restriction in which the resilient member is required to be formed into a radially thin shape. Therefore, it is possible to increase the degree of freedom in setting the operating characteristic of the on-off valve to remarkably improve the performance of the exhaust flow rate control valve. Further, the diameter of the outer pipe of the exhaust pipe does not need to be enlarged, and thus the size of the exhaust structure is not increased in a portion where the exhaust flow rate control valve is provided.

According to a second feature of the present invention, in addition to the first feature, the valve further comprises a link mechanism interposed between the resilient member and the on-off valve, the link mechanism being disposed in the space.

With the second feature of the present invention, the space for disposition of the resilient member and the link mechanism is enlarged, and thus it is unnecessary to form each of the resilient member and the link mechanism into a radially thin shape. Therefore, it is possible to increase the degree of freedom in setting the operating characteristic of the on-off valve to remarkably improve the performance of the exhaust flow rate control valve. Further, the diameter of the outer pipe of the exhaust pipe does not need to be enlarged, and thus the size of the exhaust structure is not increased in a portion where the exhaust flow rate control valve is provided.

The above and other objects, features and advantages of the invention will become apparent from the following preferred embodiment described in conjunction with the accompanying drawings.

BRIEF DESCRIPTION OF THE DRAWINGS

FIG. 6 is a prior art exhaust flow rate control valve.

DETAILED DESCRIPTION

Figure 1:
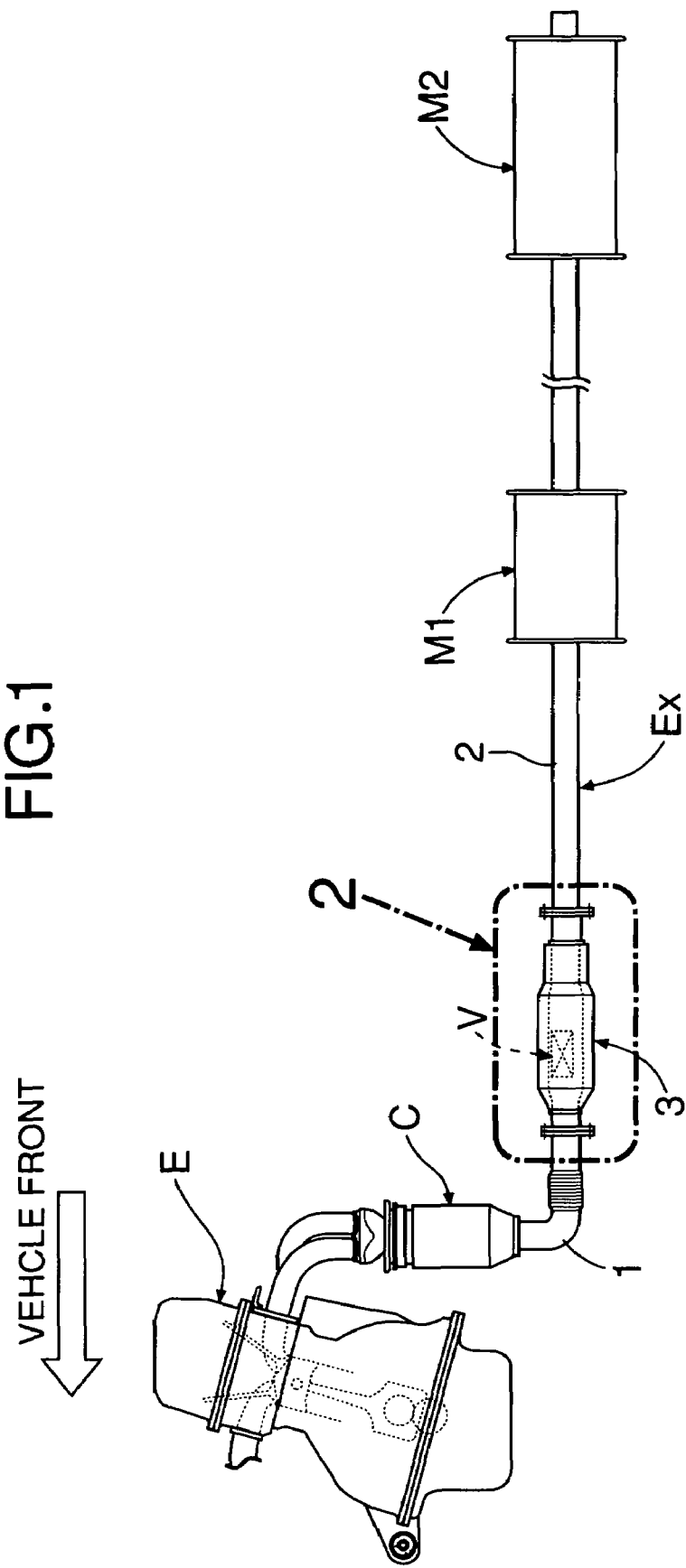
FIG. 1 is a side view of the entire exhaust system for an engine, showing an exhaust flow rate control valve according to an embodiment of the present invention disposed between an engine and a muffler.

Referring to FIG. 1, an exhaust system Ex connected to an exhaust port of an engine E extends in a longitudinal direction of an automobile. A straight-down-type exhaust catalytic converter C, an exhaust flow rate control valve V according to the present invention, a primary muffler (pre-chamber) M1 and a secondary muffler M2 are connected sequentially from an upstream side to a downstream side of the exhaust system Ex. Exhaust gas discharged from the engine E during the operation of the engine E is passed through the straight-down-type exhaust catalytic converter C, where harmful components such as HC, CO and $NO_x$ contained in the exhaust gas are removed. The exhaust gas is then passed through the exhaust flow rate control valve V and through the primary and secondary mufflers M1 and M2, where exhaust noise is removed, to be discharged to the outside.

The configuration of the exhaust flow rate control valve V will be described below in detail with reference to FIGS. 2 to 5.

Figure 2:
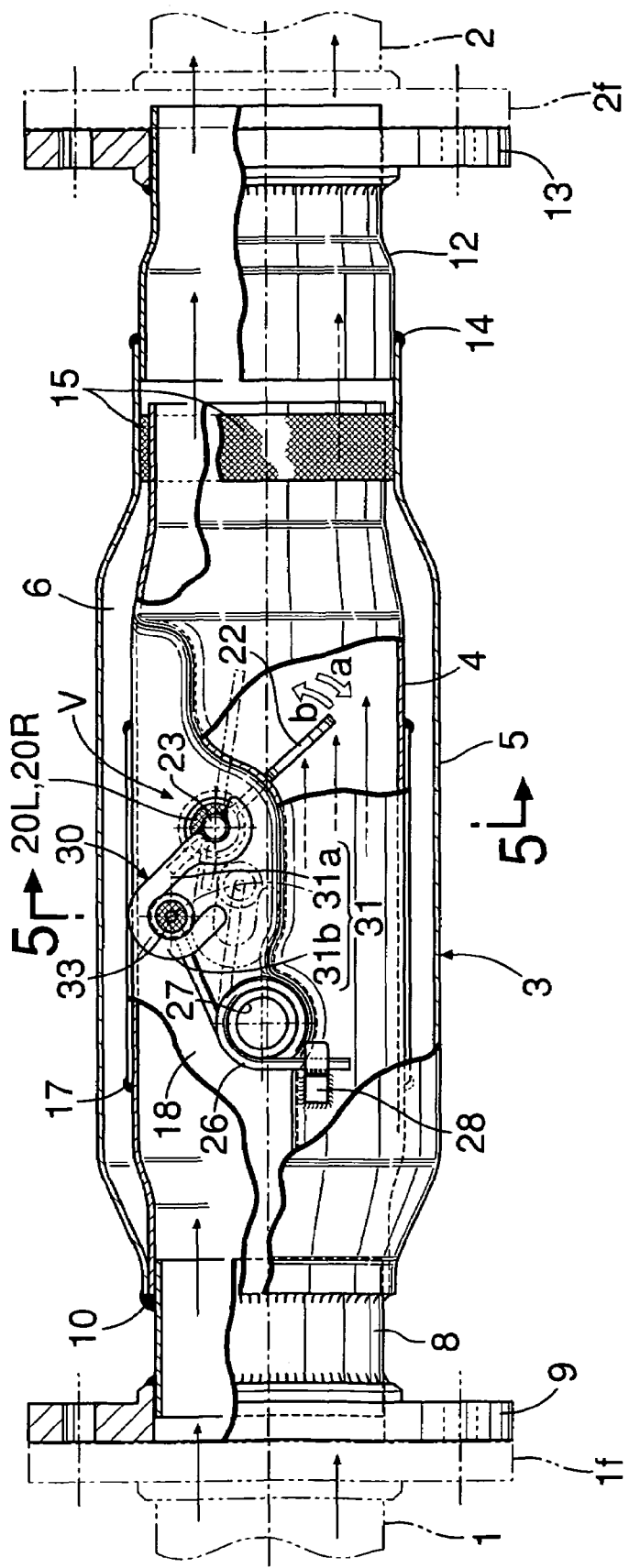
FIG. 2 is a broken enlarged view of essential portions in an area surrounded by a virtual line indicated by an arrow 2 in FIG. 1.
Figure 3:
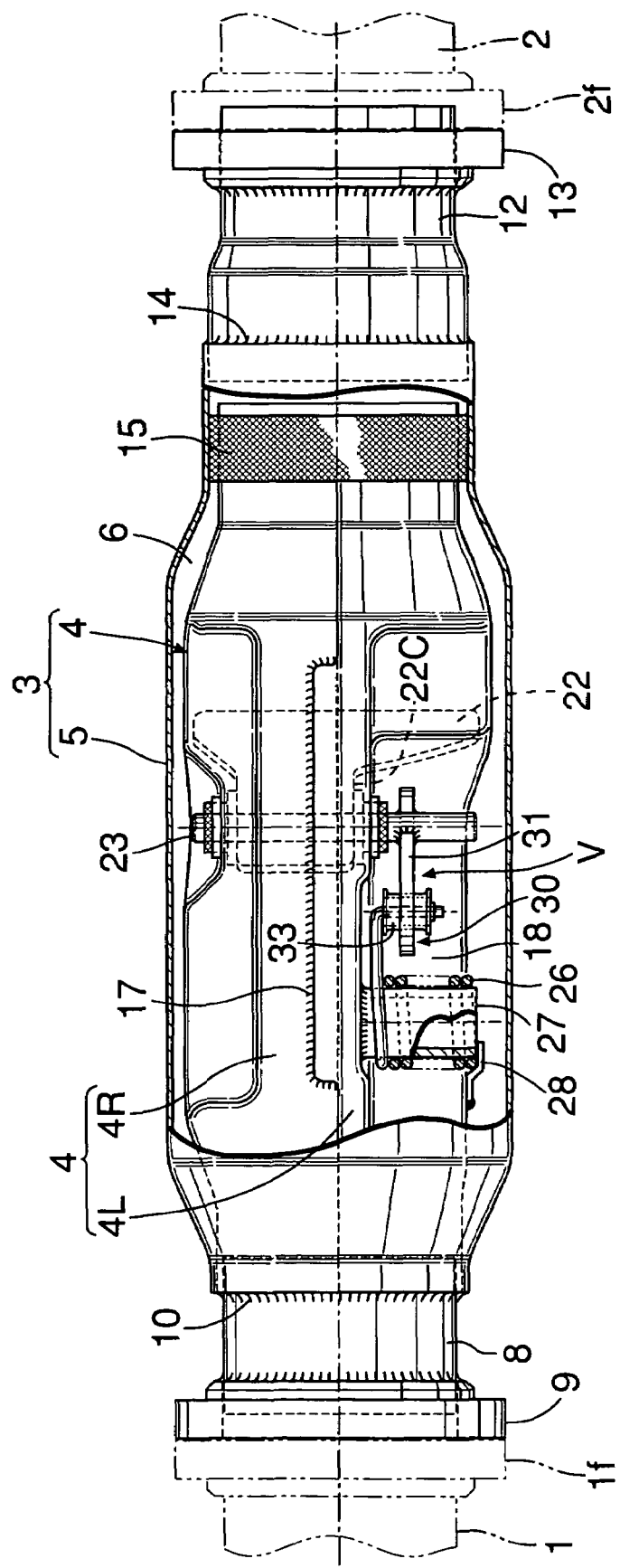
FIG. 3 is a broken view of essential portions as seen in a direction indicated by an arrow 3 in FIG. 2.

The exhaust flow rate control valve V is mounted in an exhaust pipe 3 which is connected between a downstream end of an upstream exhaust pipe 1 and an upstream end of a downstream exhaust pipe 2. The upstream end of the upstream exhaust pipe 1 is connected to an outlet of the straight-down-type catalytic converter C, and the downstream end of the downstream exhaust pipe 2 is connected to an inlet of the primary muffler M1. The exhaust pipe 3 comprises an inner pipe member 4, and an outer pipe member 5 surrounding the inner pipe member 4 with an annular space 6 provided therebetween. An upstream portion of the outer pipe member 5 is formed into a conical shape and joined to an upstream portion of the inner pipe member 4. A connecting pipe 8, connected to an upstream connecting flange 9, is fitted into the joined portion, wherein the joined portion and the connecting pipe 8 are air-tightly welded to each other. As shown in FIGS. 2 and 3, a downstream portion of the outer pipe member 5 is subjected to spinning, and a downstream end of the outer pipe member 5 is welded at 14 to a connecting pipe 12, which in turn is welded to a downstream connecting flange 13. A metal mesh ring 15 is interposed between the downstream portion of the outer pipe member 5 and a downstream portion of the inner pipe member 4, and a downstream portion of the inner pipe member 4 is supported in a floating manner in the outer pipe member 5, whereby the thermal elongation of the inner pipe member 4 is accommodated. The upstream connecting flange 9 is integrally coupled to a downstream connecting flange 1f of the upstream exhaust pipe 1 by a plurality of bolts and nuts. The downstream connecting flange 13 is integrally coupled to an upstream connecting flange 2f of the downstream exhaust pipe 2 by a plurality of bolts and nuts.

Figure 5:
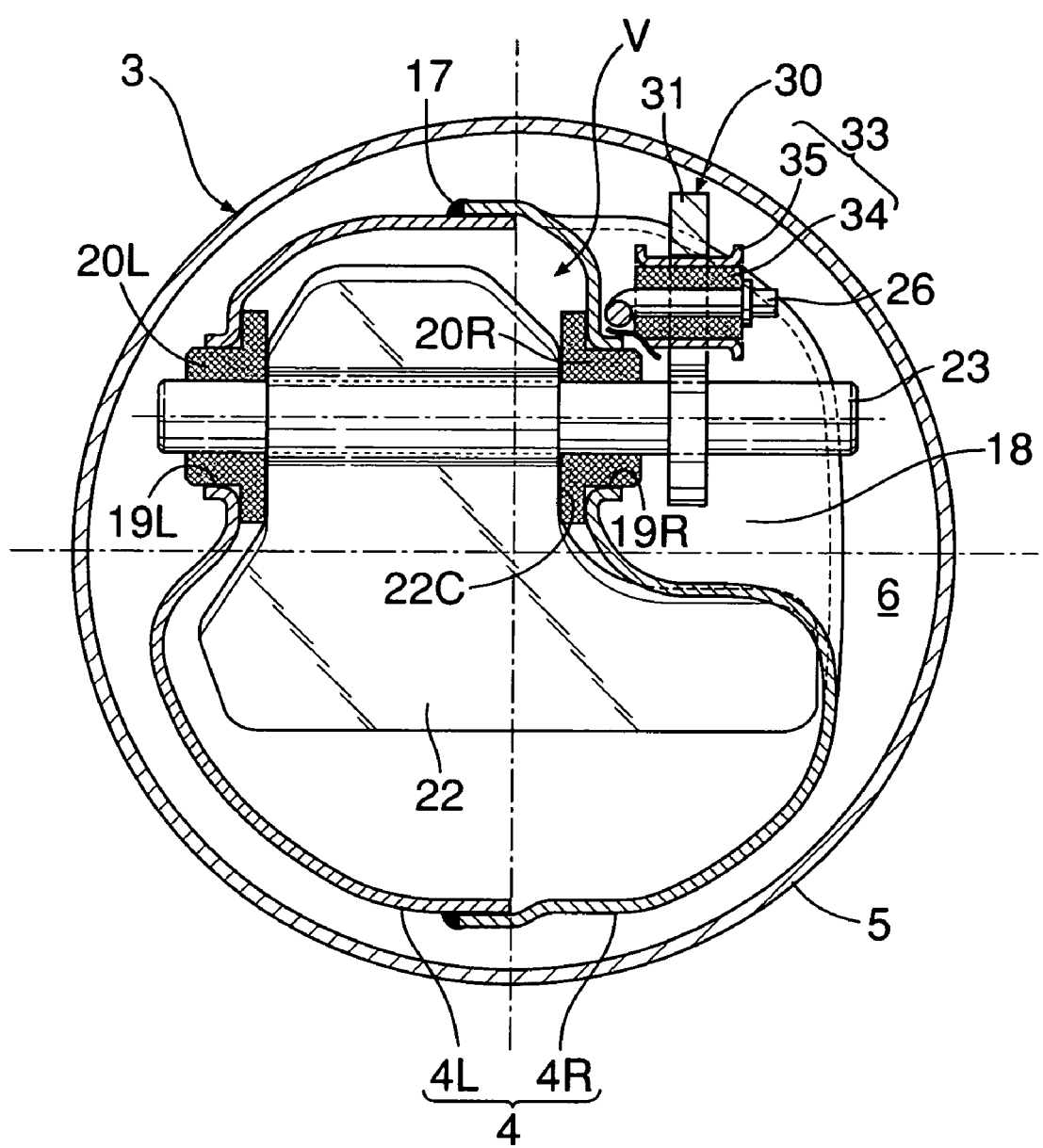
FIG. 5 is an enlarged sectional view taken along a line 5-5 in FIG. 2.

As most clearly shown in FIG. 5, the inner pipe member 4 is vertically bisected into left and right halves 4L and 4R welded at 17 to each other. A recess 18 is formed at a lengthwise intermediate portion of the inner pipe member 4 on one side of the upper half of the inner pipe member 4. Thus, the inner pipe member 4 is formed so that the sectional area of its upper half is smaller than that of its lower half. Left and right bushings 20L and 20R, each formed of a metal mesh, are fitted on the same axis into left and right bearing bores 19L and 19R. The left and right bearing bores 19L, 19R are provided in left and right opposed faces of the upper half of the inner pipe member 4 having the recess 18 formed therein. A valve shaft 23, integral with an on-off valve 22, extends through the bushes 20L and 20R so as to be rotatably supported by them. A notch 22C is formed in an upper half of the on-off valve 22 to narrow the valve width of the on-off valve 22. The upper half of the on-off valve 22, having the notch 22C formed therein, is accommodated in the upper half of the inner pipe member 4 having the decreased sectional area, so that the upper half of the on-off valve 22 is matched to the upper half of the inner pipe member 4. The valve shaft 23, fixed to the upper half of the on-off valve 22, is openably and closably supported at the upper half of the inner pipe 4 with the left and right bushings 20L and 20R interposed therebetween. On opposite sides of the upper half of the on-off valve 22, the on-off valve 22 and the valve shaft 23 integral with the on-off valve 22 are positioned by pushing the backs (inward facing surfaces) of flange portions of the left and right bushings 20L and 20R. In addition, the left and right bushings 20L and 20R, comprising metal meshes, are adapted to prevent the on-off valve 22 and the valve shaft 23 from abutting directly against the inner pipe member 4, so that abnormal sound generation during opening and closing of the on-off valve 22 is avoided.

Figure 4:
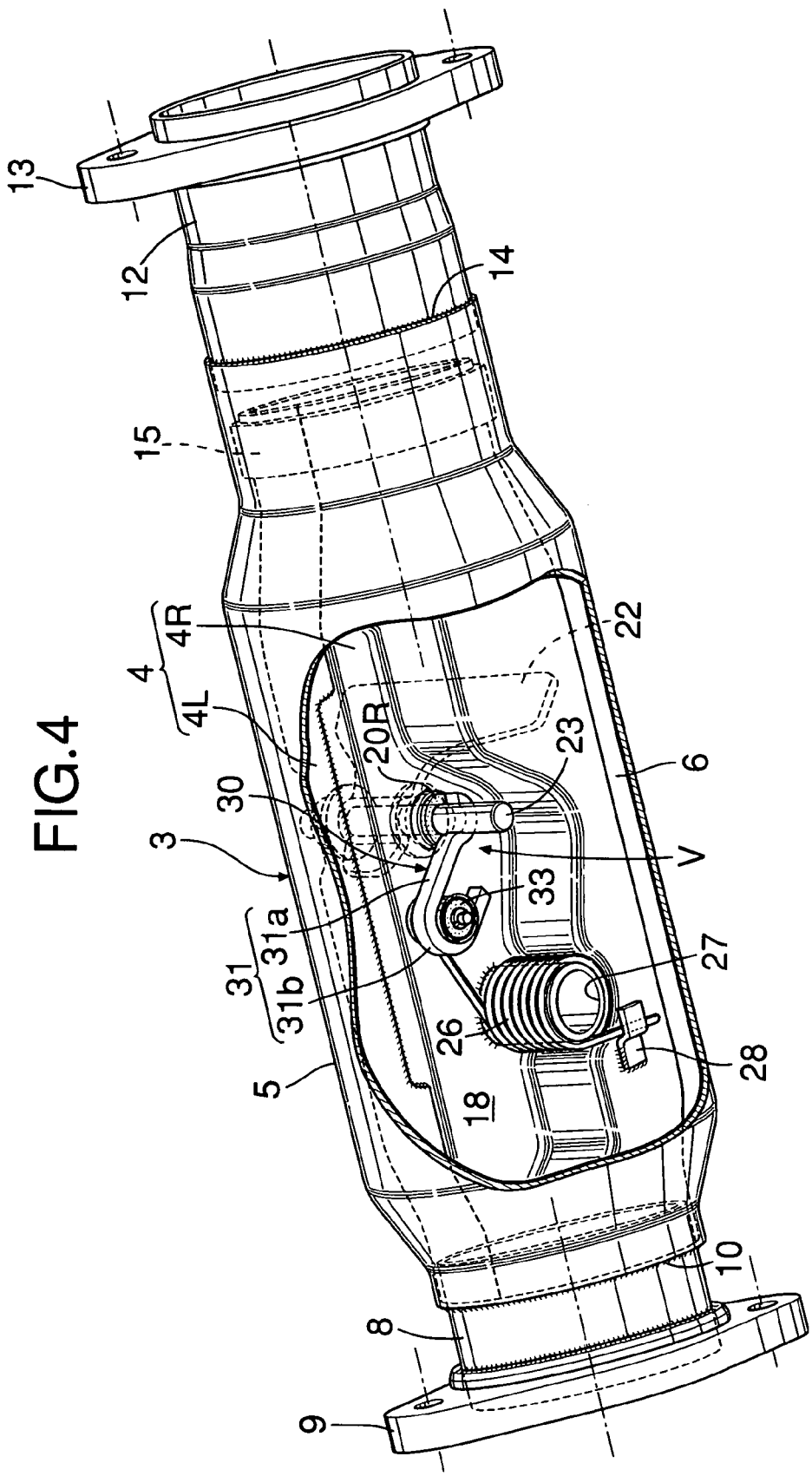
FIG. 4 is a perspective view of the exhaust flow rate control valve.

As shown in FIGS. 2 to 4, a resilient member 26 is mounted in the recess 18 formed in the inner pipe member 4 so as to bias the on-off valve 22 in a closing direction, i.e., in a direction to decrease the area of a passage within the inner pipe member 4. In this embodiment, the resilient member 26 comprises a torsion spring. The torsion spring 26 is fitted over and supported on a support tube 27 integrally protruding in a cantilevered manner from a wall surface of the inner pipe member 4 into the recess 18 so as to lie in parallel with an axis of the valve shaft 23. The torsion spring 26 is engaged at one end thereof with an engagement piece 28 fixed to the inner pipe member 4, and is connected at the other end thereof to the on-off valve 22 through a link mechanism 30. The link mechanism 30 includes a stay 31 accommodated in the recess 18 and fixed at its base end to the outside of the valve shaft 23. The stay 31 includes a straight portion 31a in the vicinity of the valve shaft 23, and a hook portion 31b extending away from the valve shaft 23. A connector 33, mounted at the other end of the torsion spring 26, is disengageably engaged with the hooked portion 31b. As shown in FIG. 5, the connector 33 comprises a metallic cylindrical member 35 fixed to an outer periphery of a cylindrical bushing 34 formed of a metal mesh.

As shown by a solid line in FIG. 2, the resilient force of the torsion spring 26 turns the stay 31 in a clockwise direction (a direction of an arrow a in FIG. 2) to bias the on-off valve 22 in the closing direction; and brings the connector 33 into resilient engagement with the hook portion 31b at a tip end of the stay 31 to switch the on-off valve 22 into a closed state. With the on-off valve 22 switched into the closed state, a narrow passage sectional area is formed within the inner pipe member 4 corresponding to a low-speed operation of the engine such as an idling operation or a starting operation.

As the exhaust pressure of the exhaust gas flowing through the inner pipe member 4 exceeds the resilient force of the torsion spring 26, the on-off valve 22 is switched in a counterclockwise direction (of an arrow b in FIG. 2), i.e., into an opened state. At this time, the connector 33 slides away from the hook portion 31b along the straight portion 31a, as shown by a dashed line in FIG. 2. When the resilient force of the torsion spring 26 and the exhaust pressure of the exhaust gas are balanced with each other, the on-off valve 22 is stably maintained at a predetermined opening degree and cannot be fluttered due to fluctuation in the exhaust pressure.

According to this embodiment, as the exhaust pressure of the exhaust gas is increased to increase the accumulated force of the torsion spring 26, the connector 33 is moved toward the valve shaft 23 (toward an axis of turning of the stay 31) so that the rotational moment acting on the stay 31 is decreased (the distance between the valve shaft 23 and the connector 33 is decreased), whereby the spring force exerted by the torsion spring 26 to the on-off valve 22 is stabilized.

The operation of this embodiment will be described below.

When the engine E is operated, the exhaust gas discharged from the engine E flows toward the exhaust system Ex. The exhaust gas flowing through the exhaust system Ex flows through the straight-down-type exhaust catalyst C to remove the harmful components such as HC, CO and $NO_x$ contained in the exhaust gas; then flows through the exhaust flow rate control valve V according to the present invention to control the flow rate of the exhaust gas; thereafter flows through the primary and secondary mufflers M1 and M2 to sequentially eliminate the exhaust noise; and is discharged to the outside.

In a low-speed operational region including the idling operation and the starting operation of the engine E, the combustion pressure in the engine E is low, and the exhaust pressure of the exhaust gas discharged from the engine E is also is low. Therefore, the exhaust dynamic pressure of the exhaust gas flowing into the exhaust pipe 3 is also low and insufficient to switch the exhaust flow rate control valve V to the opened state, and the exhaust flow rate control valve V is retained in the closed state, as shown by the solid line in FIG. 2, whereby the exhaust passage area in the inner pipe member 4 is substantially throttled. Thus, the exhaust energy can be decreased to preliminarily eliminate the exhaust noise at a location before the primary muffler M1, and enhance the charging efficiency of the engine E.

On the other and, when the combustion in the engine E is brought into the completely combusted state whereby the rotational speed reaches a high-speed operation region, the combustion pressure is also increased, and the pressure of the exhaust gas discharged from the engine E is also increased. Therefore, the dynamic pressure of the exhaust gas flowing into the inner pipe member 4 reaches a level sufficient to switch the on-off valve 22 into the opened state against the resilient force of the resilient member, i.e., the torsion spring 26, as shown by the dashed line in FIG. 2. As a result, the exhaust passage sectional area in the exhaust pipe 3 is increased to provide a reduction in the exhaust pressure loss in the high-speed rotational region of the engine E.

In the exhaust flow rate control valve V of the this embodiment, the notch 22C is formed in the on-off valve 22; the recess 18 is formed in the inner pipe member 4 to correspond to the notch 22C; and the resilient member 26 for biasing the on-off valve 22 in the closing direction is disposed in a space formed between the recess 18 and the outer pipe member 5. Therefore, a space for disposition of the resilient member 26 and the link mechanism 30, which interconnects the resilient member 26 and the on-off valve 22, can be radially enlarged, thereby eliminating a restriction in which the resilient member 26 and the link mechanism 30 were required to be formed into a radially thin shape. Thus, it is possible to increase the degree of freedom in setting the operating characteristic of the on-off valve 22 to remarkably improve the performance of the exhaust flow rate control valve V. Further, the diameter of the outer pipe 5 of the exhaust pipe 3 does not need to be enlarged, and thus the size of the exhaust structure is not increased in a portion where the exhaust flow rate control valve V is provided, thereby achieving reductions in weight and size of the exhaust system Ex as a whole.

Although the embodiment of the present invention has been described in detail, the present invention is not limited to the above-described embodiment, and various modifications in design may be made without departing from the scope of the invention.

For example, in the above-described embodiment, the exhaust flow rate control valve V according to the present invention is mounted between the straight-down-type catalytic converter C and the primary muffler M1, but it may alternatively be mounted at another place in the exhaust system Ex.

What is claimed is:

1. An exhaust flow rate control valve comprising:
   an exhaust pipe which is provided in an exhaust system for an engine and which includes an inner pipe member through which exhaust gas is passed and an outer pipe member surrounding the inner pipe member;
   an on-off valve provided in the inner pipe member and switched between a closed state in which a flow passage sectional area of the inner pipe member is decreased, and an opened state in which the flow passage sectional area is increased; and
   a resilient member disposed between the inner pipe member and the outer pipe member so as to bias the on-off valve in a closing direction,
   the on-off valve being switched from the closed state to the opened state by an increase in pressure of the exhaust gas acting on the on-off valve against a biasing force of the resilient member,
   wherein a notch is formed in the on-off valve; a recess is formed in the inner pipe member to correspond to the notch; and the resilient member is disposed in a space formed between the recess and the outer pipe member.

2. An exhaust flow rate control valve according to claim 1, further comprising a link mechanism interposed between the resilient member and the on-off valve, the link mechanism being disposed in the space.

3. An exhaust flow rate control valve comprising:
   an exhaust pipe which is provided in an exhaust system for an engine and which includes an inner pipe member through which exhaust gas is passed and an outer pipe member surrounding the inner pipe member;
   an on-off valve provided in the inner pipe member and switched between a closed state in which a flow passage sectional area of the inner pipe member is decreased, and an opened state in which the flow passage sectional area is increased; and
   a resilient member disposed between the inner pipe member and the outer pipe member so as to bias the on-off valve in a closing direction,
   the on-off valve being switched from the closed state to the opened state by an increase in pressure of the exhaust gas acting on the on-off valve against a biasing force of the resilient member,
   wherein the on-off valve comprises an upper portion and a lower portion, the upper portion of the on-off valve having a surface area which is less than the surface area of the lower portion of the on-off valve,
   and wherein in the vicinity of the on-off valve,
   the inner pipe member comprises a cross sectional shape which substantially corresponds to the peripheral shape of the on-off valve, such that the inner pipe member is formed so that a sectional area of an upper half of the inner pipe member is smaller than that of a lower half of the inner pipe member, and
   the outer pipe member comprises a circular cross section, such that a space is formed between the upper half of the inner pipe member and the outer pipe member, and the resilient member is disposed in the space formed between the inner pipe member and the outer pipe member.

4. An exhaust flow rate control valve according to claim 3, wherein the exhaust flow rate control valve further comprises a link mechanism interposed between the resilient member and the on-off valve, the link mechanism being disposed in the space.

5. An exhaust flow rate control valve according to claim 3, wherein the inner pipe member is vertically bisected into left and right halves, and wherein the left and right halves are welded to each other.

6. An exhaust flow rate control valve according to claim 3, wherein the inner pipe member is fixed to the outer pipe member at an upstream end of the exhaust flow rate control valve, and the inner pipe member is supported in a floating manner within the outer pipe member at a downstream end of the exhaust flow rate control valve.

7. An exhaust flow rate control valve according to claim 3, wherein the on-off valve is supported on a valve shaft, the valve shaft is rotatably supported in openings formed in the inner pipe member, the valve shaft comprising a length such that the valve shaft extends into the space.

8. An exhaust flow rate control valve according to claim 7, wherein the resilient member comprises a torsion spring, the torsion spring is fitted over and supported on a support tube integrally protruding in a cantilevered manner from a wall surface of the inner pipe member into the space so as to lie in parallel with an axis of the valve shaft, one end of the torsion spring is fixed to the inner pipe member, and the other end of the torsion spring is operably connected to the on-off valve.

9. An exhaust flow rate control valve according to claim 7, wherein the resilient member is fixed at one end thereof to the inner pipe member, and is connected at the other end thereof to the on-off valve through a link mechanism.

10. An exhaust flow rate control valve according to claim 9, wherein the link mechanism comprises a stay accommodated in the space and fixed at its base end to the valve shaft, the stay comprising a straight portion in the vicinity of the valve shaft, and a hook portion extending away from the valve shaft, and a connector mounted at the other end of the resilient member, the connector being disengageably engaged with the hooked portion.

* * * * *